United States Patent
Lary et al.

(10) Patent No.: US 8,127,038 B2
(45) Date of Patent: Feb. 28, 2012

(54) EMBEDDED DISTRIBUTED COMPUTING SOLUTIONS

(75) Inventors: David M. Lary, Tallahassee, FL (US); Sunjae Park, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/046,020

(22) Filed: Mar. 11, 2008

(65) Prior Publication Data

US 2009/0234907 A1 Sep. 17, 2009

(51) Int. Cl.
*G06F 15/16* (2006.01)

(52) U.S. Cl. .......................... 709/231; 709/203

(58) Field of Classification Search ............ 709/200, 709/203, 217–219, 223, 230, 231
See application file for complete search history.

(56) References Cited

U.S. PATENT DOCUMENTS

| | | | | |
|---|---|---|---|---|
| 6,038,598 A * | 3/2000 | Danneels | ............ | 709/219 |
| 6,314,565 B1 * | 11/2001 | Kenner et al. | ............ | 717/171 |
| 7,260,600 B1 * | 8/2007 | Dunn et al. | ............ | 709/203 |
| 7,299,289 B1 * | 11/2007 | Lorenz et al. | ............ | 709/231 |
| 7,475,155 B2 * | 1/2009 | Stern et al. | ............ | 709/231 |
| 2002/0040395 A1 * | 4/2002 | Davis et al. | ............ | 709/224 |
| 2003/0046385 A1 * | 3/2003 | Vincent | ............ | 709/224 |
| 2005/0171976 A1 | 8/2005 | West et al. | | |
| 2007/0174415 A1 * | 7/2007 | Cha et al. | ............ | 709/217 |
| 2007/0192818 A1 * | 8/2007 | Bourges-Sevenier et al. | ............ | 725/132 |
| 2009/0150917 A1 * | 6/2009 | Huffman et al. | ............ | 725/9 |

FOREIGN PATENT DOCUMENTS

| | | |
|---|---|---|
| EP | 1736894 A1 | 12/2006 |
| WO | WO2007/028670 A1 | 3/2007 |

* cited by examiner

*Primary Examiner* — Faruk Hamza
(74) *Attorney, Agent, or Firm* — Brevetto Law Group (57) ABSTRACT

Methods and Systems are provided for participating in distributed computing. The distributed computing program instructions are embedded in content delivered to a client computer. The client computer renders the content delivered from the server and executes the program instructions generating solutions for datasets delivered from the server, thus participating in distributed computing.

20 Claims, 6 Drawing Sheets

EMBEDDED DISTRIBUTED COMPUTING SOLUTIONS

BACKGROUND

1. Field

The present invention relates to software, and more specifically, to methods, systems and software products for enabling participation in distributed computing.

2. Background

Processing intensive problems can be solved by segmenting the calculations into smaller computing problems then assigning these smaller computing problems to networked computer systems, for example, making use of CPU and storage on the networked computer.

Distributed computing is a method of computer processing in which different parts of a computing problem are given to multiple computers. These computers calculate the solution for the part of the problem assigned, and then return the results to a server or another networked computer. Distributed computing may harness CPU cycles and storage space of many computers to solve massive computing problems. This type of computing may be, among other things, referred to as distributed computing, segmented computing, parallel computing, volunteer computing, or grid computing. SETI@home is an example distributed computing project using internet connected computers. The SETI@home server is hosted by the Space Sciences Laboratory at the University of California, Berkeley. SETI@home was released to the public on May 17, 1999.

To participate in conventional distributed computing, client computers require a software package installed on the system. This software package is typically downloaded by a computer operator to a computer system then installed by the computer operator to the computer system. In other words, existing distributed computing solutions require the user to install complex software. This tends to reduce the amount of user participation.

SUMMARY

Embodiments are disclosed herein for improved methods, systems and computer products that deliver distributed computing problems to client computers utilizing program instructions embedded in streaming content requested by a client from a server.

In accordance with various embodiments, program instructions are configured to participate in distributed computing. The distributed computing is intended to solve a problem. A request for streaming content via a network is detected and the content is sent. When the streaming content is rendered, the program instructions embedded in the content may be executed and the program instructions may contribute towards solving the problem. The program instructions may be executed while the content is being downloaded. The program instruction execution may be stopped upon detecting termination of rendering of the streaming content. Executing the program instructions may be delayed until a portion of the content has been rendered. There may be a plurality of programs of instruction and a plurality of client computers where each client computer executes one of the programs of instruction so each client computer solves a unique dataset.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Various embodiments disclosed herein utilize computer program instructions embedded with content from the server to solve a portion of a distributed computing problem.

Distributed computing is a method of computer processing in which different parts of a program run simultaneously on two or more computing devices that are communicating over a network. Distributed processing may require that a program be segmented—divided into sections that can run simultaneously. Distributed computing also requires that the division of the program take into account the different environments on which the different sections of the program will be running. For example, two computing devices may have different file systems and different hardware components. A computer system participating in distributed computing is using resources to aid in coming up with a solution to the distributed computing solution. A server or central computer may participate in distributed computing by distributing the computing workload between clients and collating the results of the client's calculations. Client computers may participate in distributed computing by using local processing and storage resources to calculate a solution for part of the distributed problem, then send the results to the client. In this context, participation does not mean the server or client need to come to a solution.

Figure 1A:
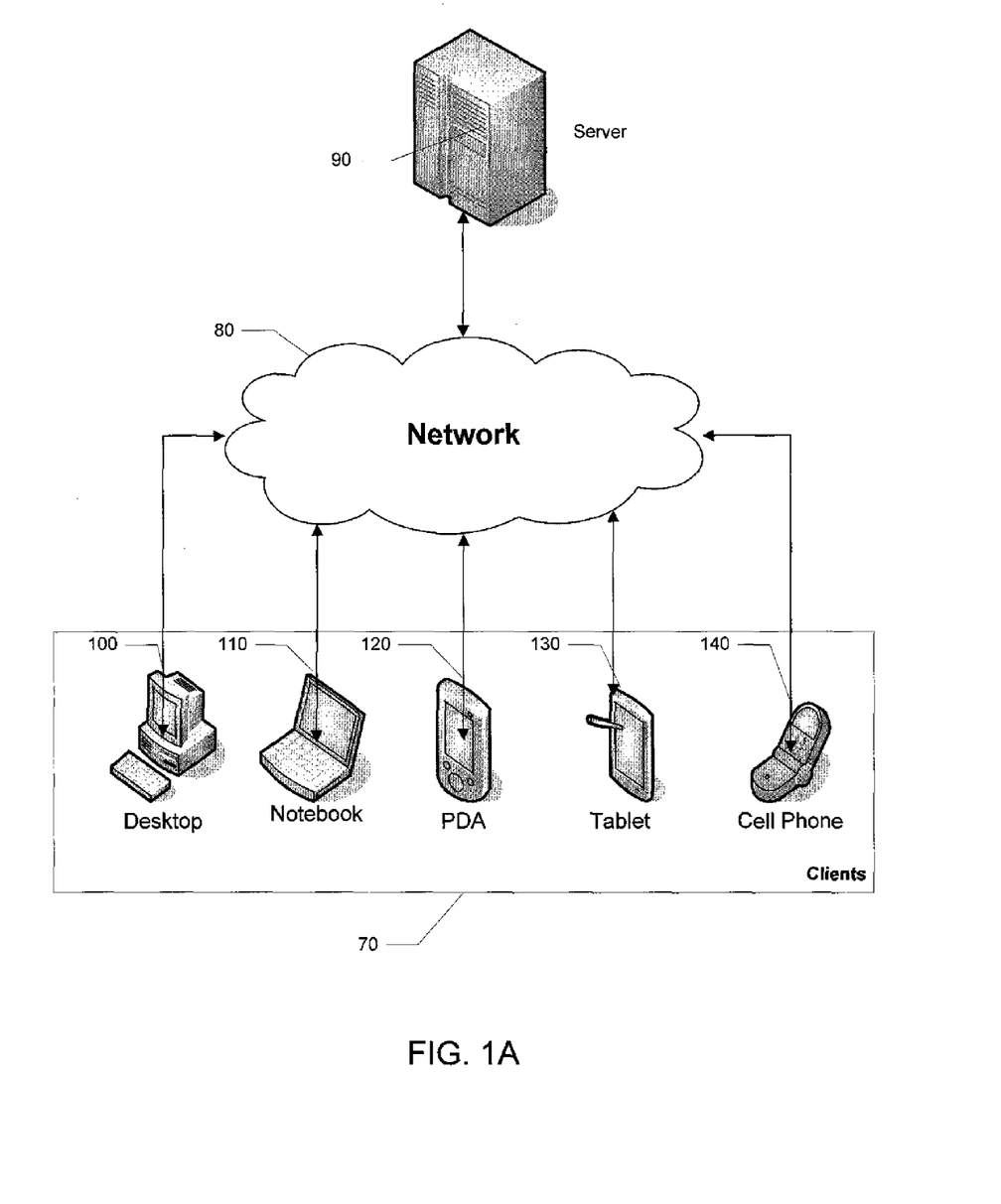
FIG. 1A depicts various client devices connected to a server through a network.

FIG. 1A shows multiple types of computing devices, also known as clients 70, connected through a network 80 to a server 90. Client computing devices may be, but are not limited to, desktop computers 100, notebook computers 110, PDAs (Personal Data Assistants) 120, Tablet computers 130, cell phones 140, and other like devices capable of processing instructions and sending and receiving signals. The network 80 may be required for the client to download the content and program instructions, however, the client may then disconnect from the network. The content may be rendered offline as well as the program instructions may execute offline. The program instructions may communicate the results to the server when the client connects to the network 80 again.

Figure 1B:
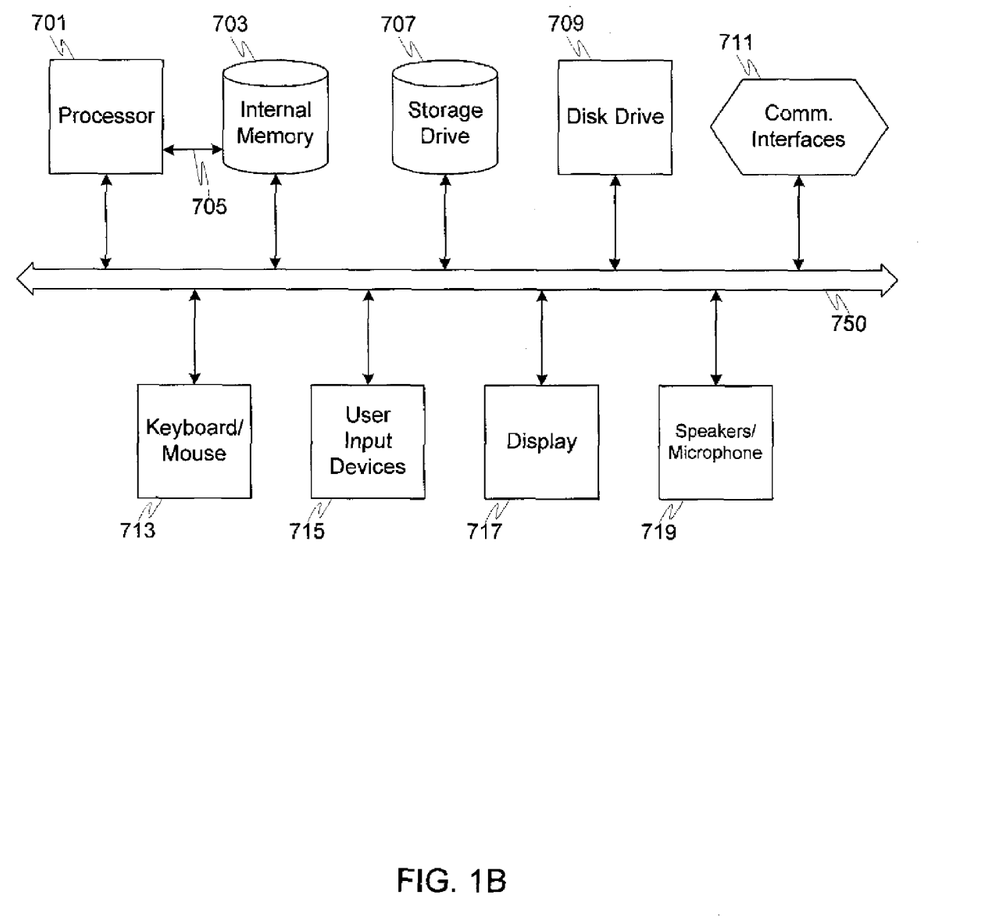
FIG. 1B is a block diagram depicting features of the exemplary desktop computer system 100 that may be used to implement various embodiments of the invention.

FIG. 1B is a block diagram depicting features of the exemplary desktop computer system 100 that may be used to implement various embodiments of the invention. It should be noted that notebook computers 110, PDAs 120, Tablet computers 130 and cell phones 140 suitable for implementing the various embodiments may also have many of the features depicted in FIG. 1B. The computer system 100 includes a processor 101 which may be embodied as a microprocessor or central processing unit (CPU). The processor 101 is typically configured to access an internal memory 103 via a bus such as the system bus 150. The internal memory 103 may include one or more of random access memory (RAM), read-only memory (ROM), cache memory, or a combination of these or other such circuitry configured to store information in a retrievable format. In some implementations the internal memory 103 may be configured as part of the processor 101, or separate from it but within the same packaging. The processor 101 may be able to access internal memory 103 via a different bus, or via control lines (e.g., local bus 105) than it uses access the other components of computer system 100.

The computer system 100 also typically includes, or has access to, one or more storage drives 107 and floppy disk drives 109. The storage drive 107 is often a hard disk drive configured for the storage and retrieval of data, computer programs or other information. The floppy disk drives 109 may include a combination of several disc drives of various formats that can read and/or write to removable machine readable medium. The machine readable medium may be any of the various available storage formats, including, for example, CD-R, CD-RW, DVD, DVD-R, floppy disk, or the like. The computer system 100 may either include the storage drives 107 and floppy disk drives 109 as part of its architecture (e.g., within the same cabinet or enclosure), as connected peripherals, or may access the storage drives 107 and floppy disk drives 109 over a network, or a combination of these. The storage drive 107 is often used to store the software, instructions and programs executed by the computer system 100.

The computer system 100 may include communication interfaces 111 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The components of computer system 100 may be interconnected by a bus 150 and/or may include expansion slots conforming to any of various industry standards such as PCI (Peripheral Component Interconnect), ISA (Industry Standard Architecture), or EISA (enhanced ISA).

Typically, the computer system 100 includes one or more user input/output devices such as a keyboard and/or mouse 113, or other means of controlling the cursor (e.g., touchscreen, touchpad, joystick, trackball, etc.) represented by the user input devices 115. A display 117 is also generally included as part of the computer system 100. The display may be any of several types of displays, including a liquid crystal display (LCD), a cathode ray tube (CRT) monitor, a thin film transistor (TFT) array, or other type of display suitable for displaying information for the user. The display 117 may include one or more light emitting diode (LED) indicator lights, or other such display devices. In addition, most computer systems 100 also include, or are connected to, one or more speakers 119 and microphones 121 for audio output and input. Speech recognition software may be used in conjunction with the microphones 121 to receive and interpret user speech commands.

Figure 2:
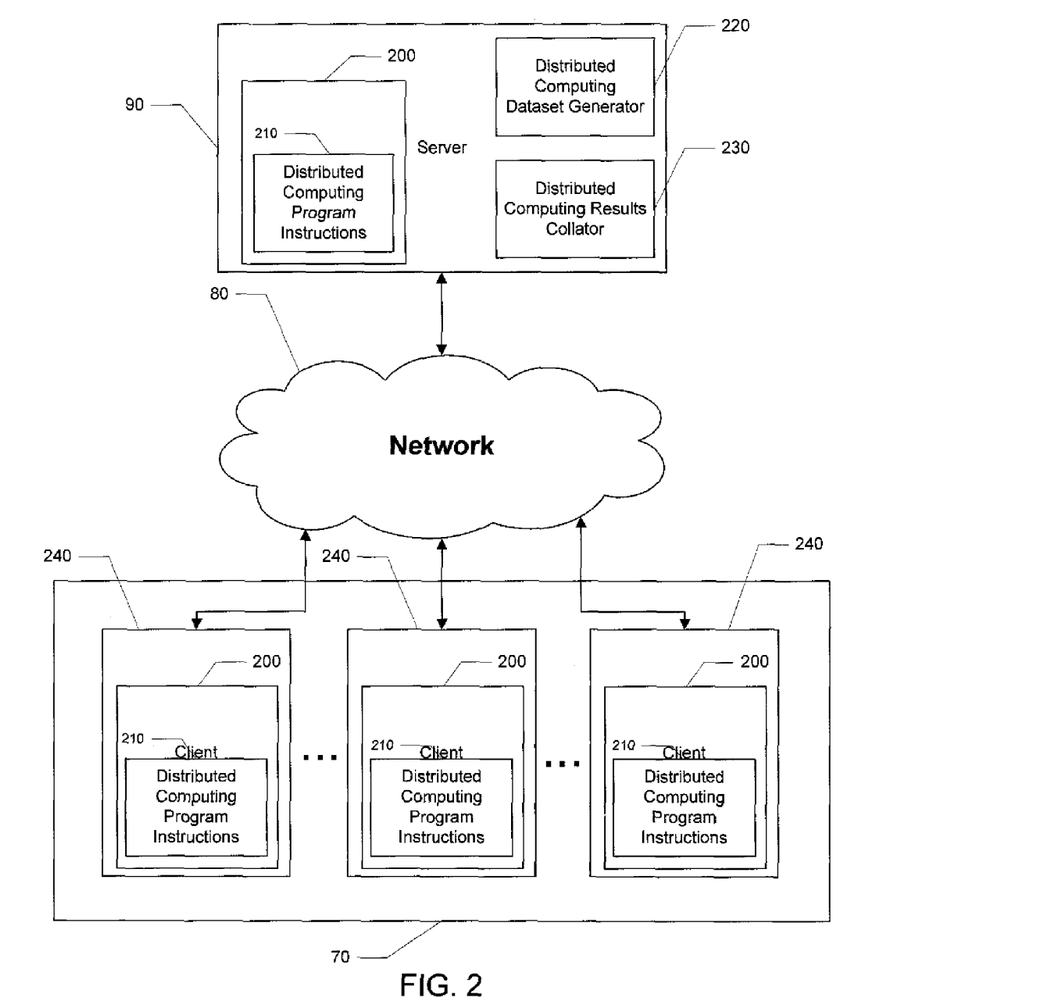
FIG. 2 depicts functional aspects of the server as well as functional aspects of the client devices.

FIG. 2 shows an exemplary embodiment, and some of the functional aspects of various embodiments of the invention. Individual clients 240 connected to the server 90 through the network 80, request content 200 from the server 90. A set of distributed computing program instructions 210 are placed with the content 200 and delivered to the client computing device 240. The client 240 renders the content 200 and executes the program instructions 210.

In some embodiments of distributed computing, the clients run the same or close to the same computing instructions, but on different datasets. In this embodiment, a server 90 controlling the distributed computing calculates a dataset for the client 240 to process. The dataset generator 220 may create datasets that are communicated to each computing device 240 participating in the distributed computing. When the client computing device 240 completes the processing of the dataset, the results may be communicated to the server and processed by the distributed computing results collator 230.

Figure 3:
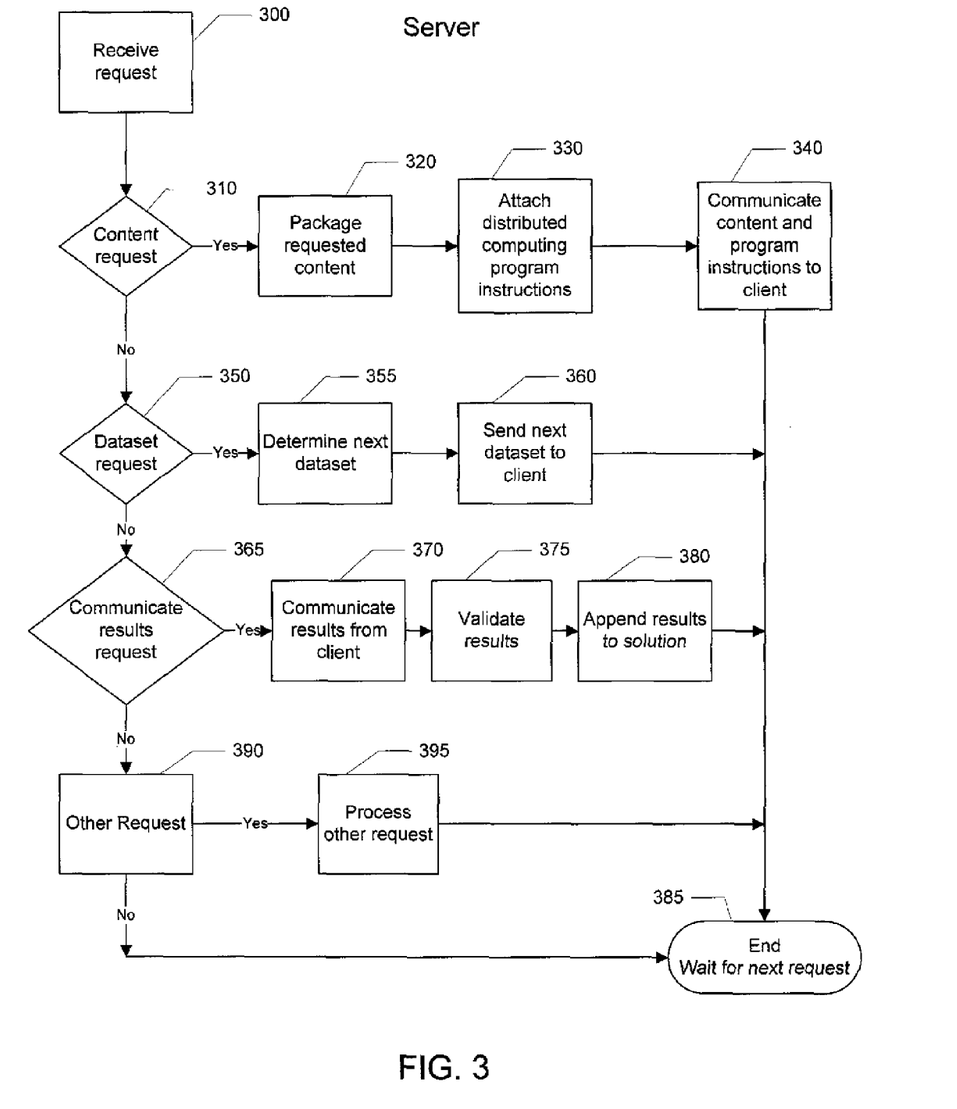
FIG. 3 depicts a flowchart of an exemplary method a server may use in communicating with a client computer that may be used to implement various embodiments of the invention.

FIG. 3 depicts a flowchart of an exemplary method a server may use in communicating with a client computer that may be used to implement various embodiments of the invention. In this embodiment the server 90 receives a request 300 from the client. Many types of request types can be made aside from the requests of blocks 310, 350, 365 and 390. This exemplary flowchart in no way lists all the intended request types. The server determines what type of request the client computing device 240 generated.

If it is determined in 310 that the request is a content request the method proceeds from 310 along the "YES" path to 320. In 320 the server 90 may package the requested content 320, attach the distributed computing program instructions 330 to the content, communicate the content and program instructions to the client computing device 240, and wait for the next request or process the next request in the queue 385. The content request 310 is a signal from the client that content is desired. The content request may be in the form of a HTTP protocol GET request through web server port 80. The content delivered to the client may be preexisting, for example a static web page with the program instructions statically attached, or the content may be generated after the request, for example an active server page. In the embodiment of the distributed program computing instructions 330 taking the form of a script, the distributed program computing instructions 330 may be attached to the content by inserting the distributed program computing instructions 330 and the delimiters for the script into the appropriate section of the requested content 320. Back in 310, if it is determined that the request is not a content request then the method proceeds from 310 along the "NO" path to 350.

If it is determined in 350 that the request is a dataset request the method proceeds from 350 along the "YES" path to 355. In 355 the server 90 may determine the next dataset for the client computing device 240 to process. This determination may be in part based on looking up the next database in a table, calculating based on the processing capabilities of the client computing device, calculating the dataset based on prior processing the client has completed, or many other factors not listed in this specification. When the next dataset is determined, the server 90 may send the dataset to the client 360, and wait for the next request or process the next request in the queue 385. Back in 350, if it is determined that the request is not a dataset request then the method proceeds from 350 along the "NO" path to 365.

If it is determined in 365 that the request is a communicate results request the method proceeds from 365 along the "YES" path to 370. In 370 the server 90 and client computing device 240 may communicate results. The server 90 may use some method of validating the results 375 such as but not limited to checking the results are within a reasonable range, or assigning the same dataset to multiple client computing devices 240 and verifying each client returns the same results. Multiple methods of validation may be used in combination to validate the results. The server 90 may append the results to the solution 380, and wait for the next request or process the next request in the queue 385. Back in 365, if it is determined that the request is not a communicate results request then the method proceeds from 365 along the "NO" path to 390.

If, in 390, it is determined that the client request is an other request as denoted in 390, the server 90 may proceed along the "YES" branch to 395. In 395 the server 90 processes the "other" request. The method then proceeds to 385 to wait for the next request or process the next request in the queue 385. Dataset requests 350 and requests to communicate results 365 may be communicated to the server 90 through the HTTP port, typically port 80, or may be communicated to the server through a port dedicated for the distributed computing communication. The term server in this example is used to denote any central computer of the distributed computing. This may be the same server as the web server 90 or may be another server separate from the web server, or may be a single client computer with capabilities to respond to the requests for datasets and results communication.

Figure 4:
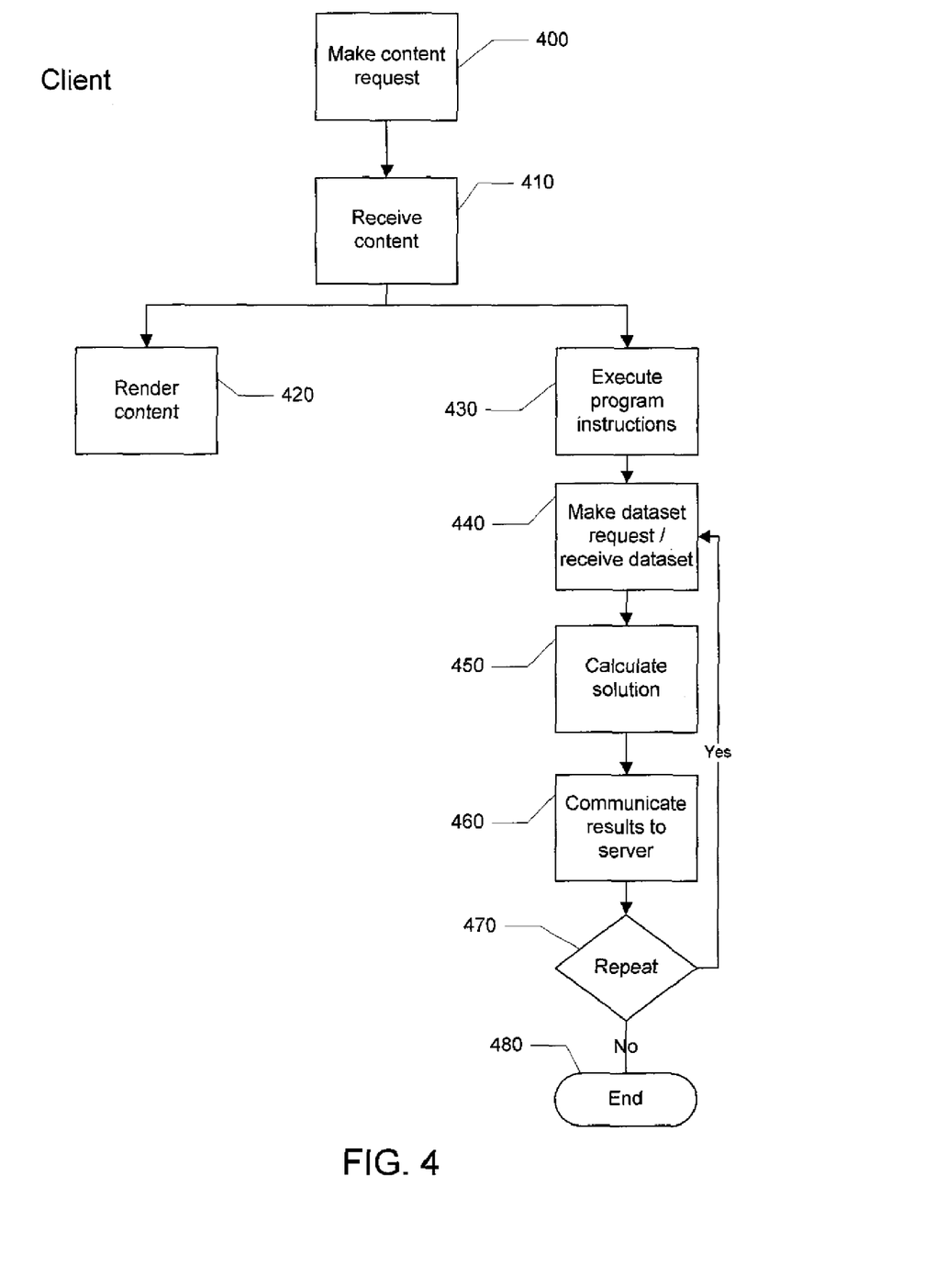
FIG. 4 depicts an exemplary flowchart a client may use in communicating with a server computer that may be used to implement various embodiments of the invention FIG. 5A lists exemplary HTML code demonstrating an external file containing program instructions.

FIG. 4 depicts an exemplary flowchart a client may use in various embodiments of the current invention. The client computing device 240 may make a content request 400 to the server 90. The client computing device 240 may receive content 410 from the server 90. This content may have distributed computing program instructions attached. The client computing device 240 may render the content 420. The term render is used here to denote presenting the content to the user. The content may be for example text, graphics, audio, video, a combination of the prior mentioned, or some other type of content or combination thereof. Exemplary formats of the content include: HyperText Markup Language (HTML), Scalable Vector Graphics (SVG), Moving Picture Experts Group Layer-3 Audio (MP3), Moving Picture Experts Group Layer-4 (MP4), Windows Media Audio (WMA), Windows Media Video (WMV), and Moving Picture Experts Group (MPEG).

Rendering the content 420 from the server 90 and executing the program instructions 430 may or may not be temporally linked. For example, the content may be rendered before the program instructions are executed allowing the client to experience the content while the program instructions are executing. An alternative embodiment may be the program instructions are executed before the content is rendered, using the client's processing and storage as a method of payment for the content. Another embodiment may be that rendering the content 420 and executing the program 430 instructions are not temporally linked in that both independently execute and do not necessarily depend on each other. In another embodiment, rendering the content 420 and executing the program 430 instructions are synchronous. An example of the rendering and execution being synchronous may be streaming content. In response to the user playing (rendering) the streaming content, the program instructions calculate. Upon detecting the user has stopped playing the streaming content, the program instructions cease calculation and may send the results to the server. In another embodiment the program instructions may execute after a portion of the content has been rendered. An example of the program instructions executing after a portion of the content may be after the introduction of an MP3 song, after the opening credits of a video file, after rendering content for a fixed amount of time, or after rendering content for a fixed number of times.

Continuing with a sample embodiment described in FIG. 4, the client 240 executes the program instructions 430, the client may make a dataset request and receive a dataset 440, calculate the solution 450 of the dataset, and communicate results to the server 460. The client 240 may end 480 the calculation steps or may continue the process looping to the dataset request/receive dataset 440 step. The calculation steps may continue for as long as the content is displayed, may end after a single calculation, may continue after the content ceases to be displayed, or may exit before a solution is complete. One exemplary embodiment where the calculation may not complete can occur if the calculation is temporally linked to the content being displayed. In such situations, if the content ceases to be displayed before a solution is calculated; the calculation may stop when the content ceases to be displayed.

The present invention anticipates multiple forms wherein the program instructions reside such as, but not limited to, Java script, VB script, Perl script Python script, CGI script Perl script, .NET script, or executable code. The executable code may be machine instructions specific to the client system. The program instructions may include instructions to calculate the dataset solution, or the program instructions may include instructions to download more program instructions from the server, the downloaded instructions including instructions to calculate the dataset solution.

Figure 5A:
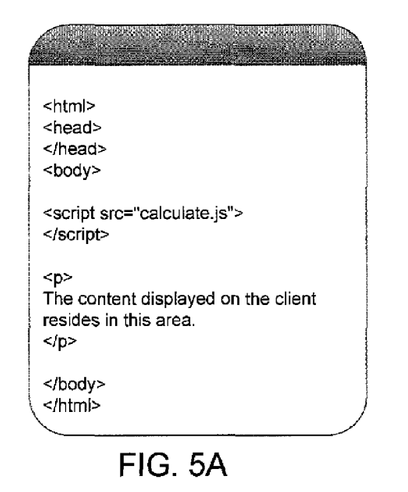
Figure 5B:
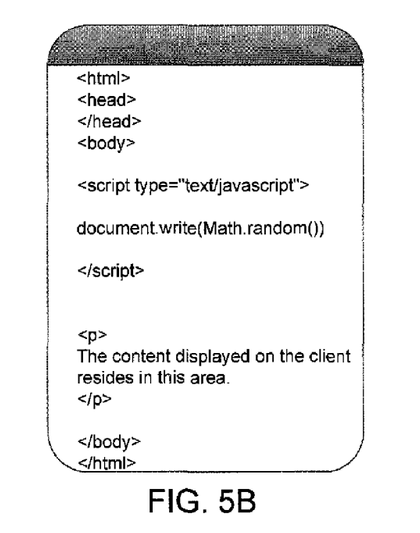
FIG. 5B lists exemplary HTML code demonstrating program instructions embedded in the HTML code.

In one embodiment Hypertext Markup Language (HTML) may be used to create a user interface where content is selected and transferred to the client. The HTML listing in FIG. 5A is an example of an external java script that is delivered with the content. In this exemplary embodiment, the program instructions take the form, of an external script file named "calculate.js". The HTML listing in FIG. 5B is an example of java script embedded in the HTML. In this exemplary embodiment, the program instructions take the form of a java script embedded in the HTML.

Figure 5C:
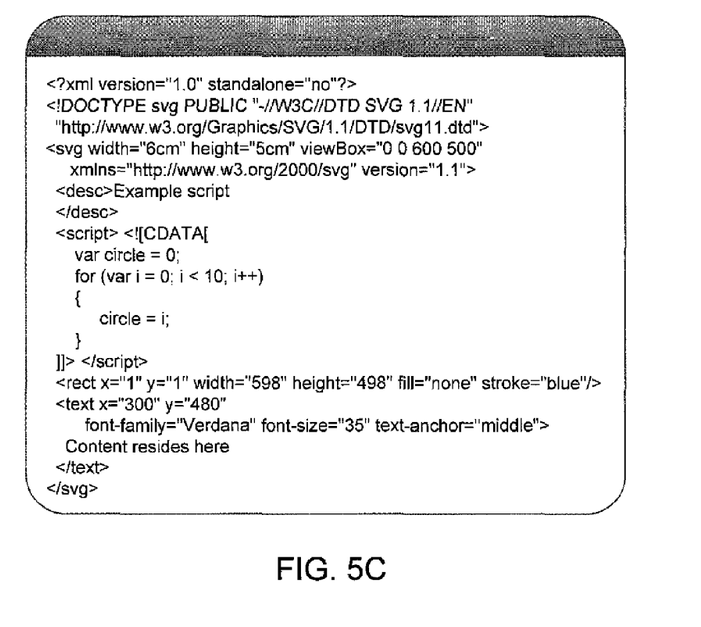
FIG. 5C lists exemplary SVG code demonstrating program instructions embedded in the SVG code.

In an alternative embodiment, SVG (scalable vector graphics) may be used to create a user interface where graphics are presented as clickable objects that allow the end user to select content. SVG is a W3C (World Wide Web Consortium standard body) standard for image processing in a World Wide Web document. The SVG specification is based on XML, which also is a W3C standard. SVG is a text-based system and does not require special editors, although a browser plug-in may be needed to render a picture. SVG defines an XML grammar for rich 2D graphics which includes features such as transparency, arbitrary geometry, filter effects (shadows, lighting effects, etc.), scripting and animation. SVG can have, for example, embedded Java scrip code. This code can, as it is loaded by the viewer, do a certain amount of computation and return the result back to a server. Massively parallel problems that individually need little computation can be solved in this fashion. If the SVG file with the embedded computing program instructions is embedded in a popular website, every client connecting to that website may contribute to solving the problem. When a user loads the SVG image, the code within the image is executed, contacting the server for arguments for the calculation, computing a solution, and then sending the solution to a server. FIG. 5c lists an exemplary SVG listing including a script that demonstrates SVG scripting ability to loop and manipulate variables.

In the embodiments described above, some of the steps may take place in a different order. For example, in FIG. 3, the requests to the server are listed in the order content request 310, dataset request 320, communicate results request 365. The requests may be coming from multiple clients and the order random. These activities could be rearranged in the order dataset request 320, content request 310, communicate results request 365, or any other like order. For example, one client could be communicating results 365 when another client makes a content request 310.

Many of the steps in the embodiments may be completed with computer code. For example the action of the server attaching the distributed computing program instructions 330 to the content may be completed by computer code running on the server.

The use of the word "exemplary" in this disclosure is intended to mean that the embodiment or element so described serves as an example, instance, or illustration, and is not necessarily to be construed as preferred or advantageous over other embodiments or elements. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of distributed computing, comprising:
    embedding first program instructions in a first streaming content, the first program instructions being configured to compute a first calculation result for the distributed computing intended to solve a problem;
        detecting at a server a first request sent from a first client for the first streaming content via a network;
        sending the first streaming content and the first program instructions embedded in the first streaming content from the server to the first client in response to the first request, said first program instructions being configured to be executed at the first client;
        receiving at the server the first calculation result of the first program instructions, said first calculation result being sent to the server from the first client;
        embedding second program instructions in a second streaming content, the second program instructions being configured to compute a second calculation result for the distributed computing intended to solve said problem;
        detecting at the server a second request sent from a second client for the second streaming content via a network;
        sending the second streaming content and the second program instructions embedded in the second streaming content from the server to the second client in response to the second request, said second program instructions being configured to be executed at the second client;
        receiving at the server the second calculation result of the second program instructions, said second calculation result being sent to the server from the second client;
        embedding third program instructions in a third streaming content, said third program instructions being the same as said second program instructions;
        detecting at the server a third request sent from a third client for the third streaming content via a network;
        sending the third streaming content with the third program instructions embedded in the third client in response to the third request, said third program instructions being configured to be executed at the third client;
    receiving at the server a third calculation result from the third client; and
        using the third calculation result from the third client to validate the second calculation result from the second client;
    wherein the first calculation result and the second calculation result received at the server both contribute towards solving said problem.

2. The method of claim 1, wherein executing the first program instructions occurs while the first streaming content is being downloaded.

3. The method of claim 1, wherein at least a portion of the first streaming content conforms to a standard selected from a group consisting of HTML, SVG, MP3, MP4, WMA, WMV and MPEG; and
    wherein the first streaming content is configured to be rendered resulting in playing audio, video or both audio and video.

4. The method of claim 1, further comprising:
    detecting termination of rendering the first streaming content; and
    stopping execution of the first program instructions in response to the termination.

5. The method of claim 1, wherein the first program instructions conform to a standard selected from a group consisting of Java script, VB script, Perl script, Python script, CGI script, .NET script, and executable code.

6. The method of claim 1, wherein the first and second program instructions are part of a plurality of programs of instructions; and
    wherein a plurality of client computers each executes one of the plurality of programs of instructions, each of the plurality of client computers solving a unique dataset.

7. The method of claim 1, wherein executing the first program instructions is delayed until a portion of the first streaming content has been rendered.

8. The method of claim 1, wherein at least a portion of the first program instructions are executed before said first streaming content is rendered.

9. The method of claim 1, wherein the first calculation result, the second calculation result, and a plurality of other calculation results received at the server both are used to solve said problem.

10. A method of participating in distributed computing, comprising:
    connecting a server to a network;
    receiving a first content request sent from a first client to the server;
    delivering from the server to the first client a first streaming content responsive to the first content request, the first streaming content containing first program instructions configured to compute a first calculation result for the distributed computing intended to solve a problem;
    receiving at the server the first calculation result of the first program instructions, said first calculation result being sent to the server from the first client;
    receiving a second content request sent from a second client to the server;
    delivering from the server to the second client a second streaming content responsive to the second content request, the second streaming content containing second program instructions configured to compute a second calculation result for the distributed computing intended to solve said problem;
    receiving at the server the second calculation result of the second program instructions, said second calculation result being sent to the server from the second client;
    embedding third program instructions in a third streaming content, said third program instructions being the same as said second program instructions;
receiving a third content request sent from a third client to the server;
    delivering from the server to the third client the third streaming content responsive to the third content request, the third streaming content containing third program instructions configured to compute a third calculation result for the distributed computing intended to solve said problem;

receiving at the server the third calculation result from the third client; and using the third calculation result from the third client to validate the second calculation result from the second client;

wherein the first calculation result and the second calculation result received at the server both contribute towards solving said problem.

11. The method of claim 10, wherein at least a portion of the first streaming content conforms to a standard selected from a group consisting of HTML, SVG, MP3, MP4, WMA, WMV and MPEG; and wherein the first streaming content is configured to be rendered resulting in playing audio, video or both audio and video.

12. The method of claim 10, wherein the first program instructions are selected from a group consisting of Java script, VB script, Perl script, Python script, CGI script, .NET script, and executable code.

13. The method of claim 10, wherein at least a portion of the first program instructions are executed before said first streaming content is rendered.

14. The method of claim 10, wherein the first calculation result, the second calculation result, and a plurality of other calculation results received at the server both are used to solve said problem.

15. A server participating in distributed computing, comprising:

a communication interface configured to couple to a network for sending a first streaming content from the server to a first client, and for sending a second streaming content from the server to a second client;

a memory suitable for storing a first set of program instructions configured for calculating a first calculation result and for storing a second set of program instructions configured for calculating a second calculation result, said first and second calculation results both being configured to contribute to solving a distributed computing problem; and a processor configured to detect a first request from the first client for said first streaming content and to detect a second request from the second client for said second streaming content, the processor further being configured to send the first set of program instructions and the first streaming content to said first client in response to the first request and to send the second set of program instructions and the second streaming content to said second client in response to the second request;

wherein the set of first program instructions is embedded in the first content and the set of second program instructions is embedded in the second content;

wherein the memory is further configured to store the first calculation result received from the first client in response to execution of the first set of program instructions by the first client, the memory further being configured to store the second calculation result received from the second client in response to execution of the second set of program instructions by the second client;

wherein the first calculation result and the second calculation result received at the server both contribute towards solving said problem;

wherein the communication interface is further configured to couple to the network for sending third program instructions embedded in a third streaming content, said third program instructions being the same as said second program instructions;

wherein the memory is further configured to store a third calculation result from a third client executing the third program instructions; and wherein the third calculation result from the third client validates the second calculation result from the second client.

16. The server of claim 15, wherein at least a portion of the streaming content conforms to a standard selected from a group consisting of HTML, SVG, MP3, MP4, WMA, WMV and MPEG; and wherein the first streaming content is configured to be rendered resulting in playing audio, video or both audio and video.

17. The server of claim 15, wherein the first program instructions are selected from a group consisting of Java script, VB script, Perl script, Python script, CGI script, .NET script, and executable code.

18. The server of claim 15, further comprising:

a plurality of client computers coupled to the network, wherein the first client and the second client are both included as part of the plurality of client computers;

the first and second client computers respectively receiving the first and second streaming content and first and second program instructions; and the first and second client computers respectively rendering the first and second content and respectively executing the first and second program instructions, the first and second program instructions configured to contribute towards solving the problem.

19. The server of claim 15, wherein at least a portion of the first program instructions are executed before said first streaming content is rendered.

20. The server of claim 15, wherein the first calculation result, the second calculation result, and a plurality of other calculation results received at the server both are used to solve said problem.

* * * * *